Sept. 25, 1956  J. H. BRIDGES  2,764,261
BRAKE DISC RETAINER
Filed April 3, 1953

INVENTOR.
JAMES H. BRIDGES,
BY
McMorrow, Berman + Davidson
ATTORNEYS.

United States Patent Office 2,764,261
Patented Sept. 25, 1956

2,764,261

BRAKE DISC RETAINER

James H. Bridges, Ruston, La.

Application April 3, 1953, Serial No. 346,681

4 Claims. (Cl. 188—72)

This invention relates to disc retainers for disc brakes and more particularly to a resilient retainer for maintaining the discs of an aircraft disc brake, of the type shown in United States Patent No. 2,423,881, substantially centered relative to the axis of rotation of the associated wheel.

It is among the objects of the invention to provide an improved brake disc retainer comprising an integral structure including a supporting block and resilient wings extending from respectively opposite sides of the block and adapted to bear against the peripheral surfaces of associated brake discs; which can be placed in a disc brake assembly between the edges of the disc and the wheel drum one between each two adjacent disc-locking keys carried by the wheel drum to resiliently press on the peripheral edges of the discs to maintain the discs substantially centered relative to the axis of wheel rotation; which includes positioning screws for the disc retainers extending through the wheel flange and the retainer blocks and engaging at least one of the brake discs to hold the brake discs against wobbling and substantially perpendicular to the axis of wheel rotation; which can be installed in a disc brake assembly with little or no modification of the brake construction; and which is simple and durable in construction, and effective and efficient in operation.

Other objects and advantages will become apparent from a consideration of the following description and the appended claims in conjunction with the accompanying drawing, wherein:

Figure 1:
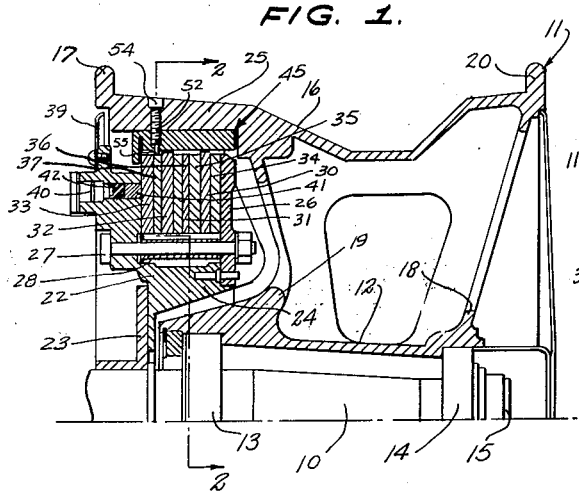
Figure 1 is a diametrical cross sectional view through one-half of an aircraft wheel and associated disc brake assembly.

With continued reference to the drawings, the numeral 10 indicates a wheel axle or spindle mounted at one end on a landing gear structure and projecting perpendicularly from the landing gear structure in horizontal position when the landing gear is in lowered position, and the numeral 11 generally indicates a wheel mounted on the spindle 10. The wheel 11 includes a hub 12 journaled on the spindle 10 by the anti-friction bearings 13 and 14 disposed one near each end of the hub and retained on the spindle by the spindle nut 15, and has a tire-receiving rim 16 coaxially surrounding the hub 12 circumspatially of the hub and secured to the hub by the spoke or web structures 17 and 18. The rim 16 is provided at its opposite sides with radially extending annular flanges 19 and 20 which engage with the beads of an associated tire, not illustrated, to retain the tire on the wheel.

A brake backing plate 22 having a central aperture therein receiving the spindle 10 is mounted on the spindle by an annular bracket 23 of right angular cross sectional shape which surrounds and is secured to the spindle 10 adjacent the associated landing gear structure. The backing plate 22 is provided with an inwardly extending annular flange 24 surrounding the adjacent portion of the wheel hub 12 in spaced relationship to the hub and the tire rim 16 includes a wheel drum 25 which surrounds and is spaced from the flange 24 of the backing plate.

A fixed outer brake disc 26 is disposed in the annular space between the flange 24 and the drum 25 and is secured to the backing plate by bolts 27 extending through registering apertures in the backing plate and the fixed brake disc 26 at substantially equal angular intervals around the backing plate flange 22. The bolts 27 are disposed adjacent the outer surface of the backing plate flange 22 and wear sleeves 28 are provided one on each bolt 27 between the inner surface of the backing plate 22 and the inner surface of the fixed brake disc 26.

Movable brake discs 30, 31, 32 and 33 surround the flange 24 between the backing plate 22 and the fixed outer disc 26 and facings of friction material, as indicated at 34, 35, 36 and 37, are disposed between adjacent brake discs. In the arrangement illustrated the linings 34 and 35 disposed at respectively opposite sides of the disc 30 are preferably secured to this disc and the linings 36 and 37 disposed at the respectively opposite sides of the disc 32 are preferably secured to the disc 32.

The discs 31 and 33 are notched around their inner edges to receive the sleeves 28 and bolts 27 to hold these discs against rotation relative to the non-rotatable backing plate 22 and the discs 30 and 32 are notched in their outer edges to receive keys, as indicated at 38, which extend transversely of the inner surface of the wheel drum 25 and are seated in recesses provided in the inner surface of the wheel drum at substantially equal angular intervals around the wheel drum so that the discs 30 and 32 are forced to rotate with the wheel 11.

The maximum or outside diameter of the backing plate 22 is less than the inside diameter of the wheel drum 25 to provide an annular space between the peripheral surface of the backing plate and the inner surface of the wheel drum through which access may be had to the keys 38 and to the disc retainers, presently to be described, and this annular space is covered by an annular dust shield 39 detachably secured to the backing plate 22 around the outer edge of the backing plate.

An annular channel 40 is provided in the backing plate near the outer edge thereof and opens to the adjacent side of the non-rotatable brake disc 32 and a ring-type piston 41 and seal ring 42 are disposed in the annular channel 40 adjacent the disc 33. The channel 40 is connected to the brake hydraulic system of the associated vehicle so that fluid under pressure can be applied to the piston ring 41 to force the discs of the brake assembly together to compress the facings between the corresponding discs when the brake is applied.

With the above described arrangement, when the wheel 11 rotates and the brake is not applied, that is, when the brake discs are separated from each other, the discs will move a limited amount relative to the backing plate flange 22 and wheel drum 25 causing an objectionable noise and, in cases where the brake discs are sufficiently separated by the brake disengaging springs 44 when the brakes are released, there is a tendency for the brake discs to wobble and to move out of a position at which they are substantially perpendicular to the rotational axis of the wheel 11 thereby causing the discs to rub together at separated locations therearound and involving unnecessary wear of the brake linings.

Means have been previously proposed to overcome the above mentioned defects, such means taking the form of U-shaped leaf springs disposed in the space between the inner surface of the wheel drum 25 and the peripheral edges of the brake discs between adjacent disc-locking keys 38 to hold the discs substantially centered relative to the rotational axis of the wheel and prevent the discs from rattling when the wheel rotates with the brake released. Such spring retainers do not, however, hold the brake discs against wobbling and unnecessary wear and also have a tendency to break and deposit fragments between the brake discs and the associated brake linings causing damage to the brake parts and frequently causing the associated wheel to lock, in some cases resulting in the damaging or wrecking of the associated airplane.

In accordance with the present invention, disc retainers, as generally indicated at 45, are disposed in the space between the peripheral surfaces of the brake discs and the inner surface of the drum 25 is replacement of the disc retaining springs provided as original equipment in the brake assembly. The disc retainers 45 are disposed one between each two adjacent keys 38 and have a length sufficient to extend substantially between the opposed sides of each two adjacent keys. Each spring retainer comprises a mounting block 46 of rectangular cross sectional shape having a length substantially equal to the thickness of the disc and lining assembly of the brake and a thickness which is slightly less than the distance at the corresponding location from the peripheral surfaces of the brake discs to the inner surface of the drum 25. If necessary, the discs 30 and 32 drivenly connected to the drum 25 of the wheel 11 by the keys 38 may be notched to receive the mounting blocks 46 of the disc retainers.

In addition to the mounting block 46 each disc retainer also includes a pair of resilient wings 47 and 48 extending from respectively opposite sides of the mounting block 46 at the top or outer surface of the mounting block and a flange 50 disposed on one end of the mounting block 46 and extending equal distances to respectively opposite sides of the mounting block. The resilient wings 47 and 48 have a thickness materially less than the thickness of the mounting block 46 and are longitudinally curved to an ogee shape so that the outer surfaces of these wings are convex adjacent the mounting block 46 and concave adjacent the outer ends of the wings.

Figure 5:
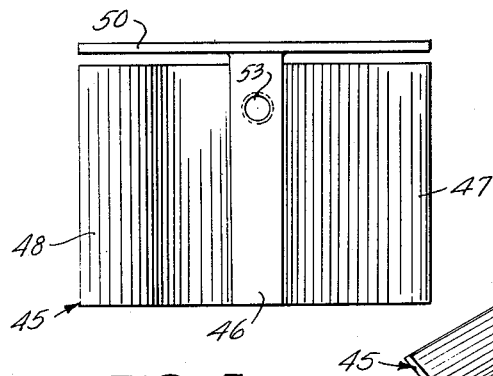
Figure 5 is a bottom plan view of the brake disc retainer.
Figure 6:
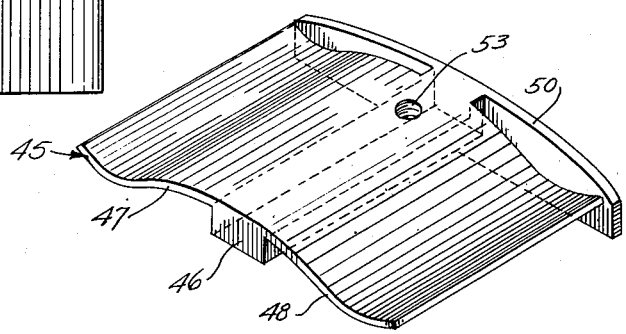
Figure 6 is a perspective view of the brake disc retainer.

The flange 50 is a flat structure disposed substantially perpendicular to the wings 47 and 48 and spaced from the adjacent sides of the wings, as particularly illustrated in Figure 5.

Figure 2:
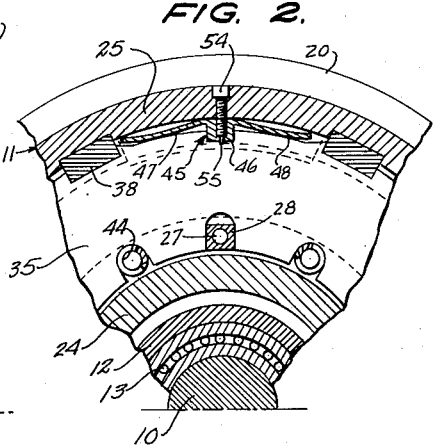
Figure 2 is a fragmentary cross sectional view on the line 2—2 of Figure 1.
Figure 3:
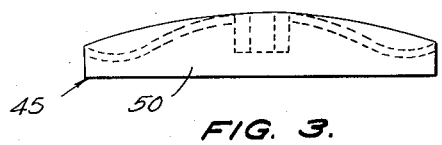
Figure 3 is a side elevational view of a brake disc retainer disposed in the brake assembly illustrated in Figures 1 and 2.
Figure 4:
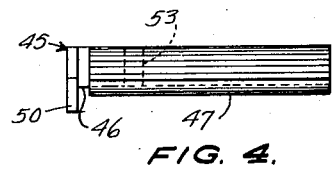
Figure 4 is an end elevational view of the brake disc retainer illustrated in Figure 3.

When a disc retainer 45 is operatively disposed in the brake assembly between the inner surface of the wheel drum 25 and the peripheral edges of the brake discs the outer surface of the mounting block 46 and adjacent inner portions of the wings 47 and 48 bear against the inner surface of the wheel drum, as illustrated in Figure 1, and the wings bear resiliently against the peripheral surfaces of the brake discs near the outer ends of the wings, as illustrated in Figure 2. The flange 50 extends inwardly from the adjacent end of the mounting block 46 and overlies at its inner edge the outer edge of the brake disc 33 adjacent the backing plate 22 to hold this brake disc against tilting or wobbling movements. The resilient pressure of the wings of the disc retainers on the peripheral surfaces of the discs holds the discs substantially centered relative to the rotational axis of the associated wheel 11 and prevents the discs from rattling when the wheel is rotated with the brake released.

The wheel drum 25 is provided with screw threaded apertures, as indicated at 52, extending therethrough at angularly spaced apart locations therearound and the mounting block 46 of each disc retainer 45 is provided with a transverse aperture 53 registering with a corresponding aperture 52 in the wheel drum. Screws, as indicated at 54, are threaded one through each of the apertures 52 in the wheel drum and into the apertures 53 in the corresponding disc retainers 45 to secure these disc retainers in proper operative positions in the brake assembly. The apertures 53 extend entirely through the corresponding mounting blocks 46 of the disc retainers and each of the screws 54 has on its inner end a non-screw threaded projection 55, of reduced diameter, which projects inwardly of the corresponding disc retainer mounting bar 46 and engages behind the brake disc 32 at the outer edge of this disc to hold the disc 32 against tilting or wobbling when the wheel 11 is rotated with the brake released.

Where the second wheel driven disc 30 is provided, as in the arrangement illustrated. a second screw, if desired, may be extended through the wheel drum and the disc retainer to engage this second disc and hold it substantially perpendicular to the rotational axis of the associated wheel when the brake is released.

The invention may be embodied in other specific forms without departing from the spirit or essential characteristics thereof. The present embodiment is, therefore, to be considered in all respects as illustrative and not restrictive, the scope of the invention being indicated by the appended claims rather than the foregoing description, and all changes which come within the meaning and range of equivalency of the claims are, therefore, intended to be embraced therein.

What is claimed is:

1. In a brake, the combination of a stator including a backing plate and at least one friction disc connected thereto; a rotor including a wheel drum surrounding and spaced from the stator, at least one friction disc surrounded by and spaced from the drum, and keys connecting the drum and second-named disc for joint rotation; and resilient, yielding means spaced circumferentially of and secured to the drum and pressing upon both the stator and rotor discs along lines extending radially and inwardly of the discs.

2. In a brake, the combination of a stator including a backing plate and at least one friction disc connected thereto; a rotor including a wheel drum surrounding and spaced from the stator, at least one friction disc surrounded by and spaced from the drum, and keys connecting the drum and second-named disc for joint rotation; and resilient, yielding means spaced circumferentially of and secured to the drum and pressing upon both the stator and rotor discs along lines extending radially and inwardly of the discs, said means comprising retainers each of which includes a block, fastening means passing through the drum into the block, and resilient wings extending in opposite directions from the block and bearing against the discs.

3. In a brake, the combination of a stator including a backing plate and at least one friction disc connected thereto; a rotor including a wheel drum surrounding and spaced from the stator, at least one friction disc surrounded by and spaced from the drum, and keys connecting the drum and second-named disc for joint rotation; and resilient, yielding means spaced circumferentially of and secured to the drum and pressing upon both the stator and rotor discs along lines extending radially and inwardly of the discs, said means comprising retainers each of which includes a block, fastening means passing through the drum into the block, and resilient wings extending in opposite directions from the block and bearing against the discs, each wing bearing against the discs of both the stator and the rotor.

4. In a brake, the combination of a stator including a backing plate and at least one friction disc connected thereto; a rotor including a wheel drum surrounding and spaced from the stator, at least one friction disc surrounded by and spaced from the drum, and keys connecting the drum and second-named disc for joint rotation; and resilient, yielding means spaced circumferentially of and secured to the drum and pressing upon both the stator and rotor discs, said means comprising retainers each of which includes a block, fastening means passing through the drum into the block, and resilient wings extending in opposite directions from the block and bearing against the discs, said fastening means extending radially of the discs into engagement with one at least of the discs at one side of the disc, to provide an abutment limiting the disc against movement in one direction out of the plane in which it is normally disposed.

References Cited in the file of this patent

UNITED STATES PATENTS

| | | |
|---|---|---|
| 1,933,176 | Jonsson | Oct. 31, 1933 |
| 2,042,809 | Shelor | June 2, 1936 |
| 2,542,545 | Lyman | Feb. 20, 1951 |